3,300,441
POLYACETALS STABILIZED WITH
PHENOXYPROPIONITRILES
Heinz Schmidt, Günther Roos, and Otto Mauz, Frankfurt am Main, Germany, assignors to Farbwerke Hoechst Aktiengesellschaft vormals Meister Lucius & Brüning, Frankfurt am Main, Germany, a corporation of Germany
No Drawing. Filed June 26, 1963, Ser. No. 290,625
Claims priority, application Germany, June 27, 1962, F 37,167
18 Claims. (Cl. 260—45.8)

The present invention relates to stabilized polyacetals and to a process for making the same.

Polyacetals are polymers having the following structural unit $$-\left[\begin{matrix}|\\C-O\\|\end{matrix}\right]-$$

wherein advantageously two hydrogen atoms or a hydrogen atom and an alkyl radical which may be substituted are bound to the carbon atom.

Various processes are known for making macromolecular polyacetals by anionic or cationic polymerization. It is also possible to copolymerize aldehydes and cyclic acetals with cyclic formals of cyclic ethers or other monomers that can be polymerized according to an ionic polymerization mechanism. Homopolymers as well as copolymers of acetals decompose under the action of heat and cannot, therefore, be made into satisfactory finished parts on the usual processing machines for thermoplasts. Under the action of heat, the polymer may undergo a degradation starting at the ends of the chains with reformation of the monomers or the polymer may be decomposed by chain cleavage. Since the said copolymers contain ether bonds, in addition to acetal bonds, in the macromolecular chains, the thermostability of the copolymers is superior to that of acetal homopolymers but still fails to meet practical requirements.

It has already been proposed to stabilize polyacetals (homopolymers) against the action of heat by using hydrazine derivatives, thiourea derivatives, polyamides or dicarboxylic acid amides.

All these substances serve to intercept the aldehydes that are formed in the course of the thermal splitting and their secondary products, to block the active centers forming in the polymer and to prevent depolymerization. Under the simultaneous action of heat and oxygen, polyacetals are still more unstable. Various substances have already been proposed for stabilizing polyacetals against a degradation by oxidation. Exemplary of such substances are aromatic amines, phenols and organic compounds containing sulfur atoms and nitrogen atoms in the molecule, e.g. thiodiazoles or organic mono- or polysulfide cmpounds.

As effective stabilizers against the degradation by the action of light, compounds of the benzo- or acetophenone type have already been proposed.

Now we have found that polyacetals, the structural units of which consist substantially of —O—$CH_2$— groups and

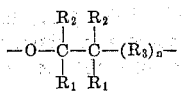

groups, wherein each $R_1$ and $R_2$ represents a hydrogen atom, lower alkyl radical, or halogen-substituted lower alkyl radical, and $R_3$ represents a methylene-, oxymethene- or lower alkylene-radical, a halogen-substituted lower alkylene radical or a halogen-substituted oxymethylene radical and $n$ stands for zero or a whole number within the range of 1 to 3, advantageously macromolecular copolymers of trioxane and cyclic formals or cyclic ethers, for example, diglycol formal, dioxolane, butane-diol-formal, tetra-hydrofurane or ethylene oxide, preferably copolymers consisting of 90 to 99 percent, by weight of the copolymer, of polymerized trioxane, and 10 to 1 percent of polymerized cyclic formals or cyclic ethers, for example copolymers of 95 to 99% by weight of trioxane and 5 to 1% by weight of diethylene glycol formal, or of 95 to 99% by weight of trioxane and 5 to 1% by weight of ethylene oxide, can be protected against the action of heat and oxygen by adding to the polymers 0.1 to 10% by weight, calculated on the total monomer mixture, advantageously 0.5 to 5% by weight, calculated on the total monomer mixture, of at least one addition product of acrylonitrile with substituted mono- or bisphenols. As substituted mono- or bisphenols there may be used those which are substituted in the ortho- or para-position or in the ortho and para-position to the hydroxyl group by aliphatic hydrocarbon radicals having 1 to 7 carbon atoms, for example methyl radicals, isopropyl radicals, isobutyl radicals, and tertiary butyl radicals, or by phenylethyl or isobornyl radicals. Compounds carrying one or more substituents may be used. Products that are substituted in the ortho and para-position are especially suitable. The latter have a considerably better stabilizing effect than substances that are substituted only in the ortho- or the para-position. The acrylonitrile combines additively with the hydroxyl group of the substituted phenol. Exemplary of particularliy effective stabilizers are the following:

6,6'-bis-(2-tert.-butyl-4-methyl-phenoxypropionitrile)-methane,
4-methyl-2,6-di-(phenylethyl)-phenoxypropionitrile,
3-methyl-6-tert.-butyl-2,4-di-isobornyl-phenoxypropionitrile,
2-isobornyl-4,6-dimethyl-phenoxypropionitrile,
2-tert.-butyl-4,6-diisobornyl-phenoxypropionitrile,
2-tert.-butyl-4-isobornyl-phenoxypropionitrile,
2-tert.-butyl-4-methyl-phenoxypropionitrile,
3-methyl-6-tert.-butyl-phenoxypropionitrile.

The compounds to be used in the process of the invention may be used alone or in admixture with one another. The stabilizing action of phenols known in the art to stabilize polyacetals can be improved by additive combination of acrylonitrile with the hydroxyl group. The effect of the compounds to be used in accordance with the invention may, in part, be enhanced by the addition of 0.1 to 10% by weight of known stabilizers. Polyacetals, advantageously trioxane copolymers, that are particularly stable towards heat and oxidation are obtained by adding secondary amines in addition to the stabilizers to be used in accordance with the present invention. Suitable amines taught in Belgian Patent 616,423 are, for example, dicyandiamide, biguanide, formamide or melamine.

By the addition of known light stabilizers to the polyacetals stabilized by the process of the invention, products of very good utility are obtained.

The use of macromolecular polyacetals as a plastic material assumes a satisfactory stability of the macromolecular polyacetals during the treatment in the thermoplastic range, and shaped articles made of such macromolecular polyacetals must withstand the action of heat, oxygen and light, without undergoing degradation or embrittlement. Especially in the work-up on the usual thermoplast-processing machines, such polyacetals tend to decompose with the formation of aldehydes and their secondary products. The pressure of the gaseous decomposition products may become so high that the plastic mass may be driven out of the cylinder of the injection moulding machine and blistered articles may be obtained which are useless.

The stabilizers used in accordance with the invention serve to restrain or prevent the depolymerization of the polyacetals.

To determine the stabilizing effect which includes the stability towards heat and oxidation, the stabilizers to be used in the process of the invention were added in varying concentrations to copolymers of 98% by weight of trioxane and 2% by weight of ethylene oxide and the loss in weight in percent of the stabilized polyacetal at 230° C. in nitrogen or oxygen within 30 minutes was measured. The loss in weight is indicated as dissociation constant $K_d$ at 230° C. in percent per minute. Furthermore, the individual powder mixtures were made into pressed plates 0.5 mm. thick (compressed at 190° C. under a pressure of 50 kg. per cm.² which was increased to 100 kg. per cm.² on cooling) and the resistance to aging at elevated temperatures was determined by annealing at 120° C. in a heating chamber. In the table given hereinafter the test values ascertained are compared with the corresponding test values obtained in an unstabilized copolymer and in a copolymer stabilized with phenol. The stabilizers to be used in accordance with the invention may be added to the macromolecular polyacetals by known methods. For example, the dry stabilizers may be intimately mixed with the polyacetals in a highly effective mixer or they may be incorporated into the plastic mass at elevated temperature in a kneader. Alternatively, the stabilizers may be dissolved in a solvent and the solution so obtained may be added to the polyacetals. To obtain a particularly homogeneous distribution of the stabilizer, the solution of the stabilizer in a solvent is added to the polyacetal, while stirring, and the solvent is subsequently evaporated in a hot nitrogen stream, while stirring. It is also possible to suspend the stabilizer and the polyacetal in a solvent and then to evaporate the solvent in a hot nitrogen stream, while stirring.

The stabilizers to be used in accordance with the invention can be used for stabilizing polyacetals containing terminal hydroxyl groups as well as polyacetals the terminal hydroxyl groups of which have been blocked by esterification or etherification.

The following examples serve to illustrate the invention but they are not intended to limit it thereto, the parts being by weight.

EXAMPLE 1

1 part 6,6′ - bis - (2-tert.-butyl-4-methyl-phenoxypropionitrile)-methane+0.2 part dicyandiamide in 100 parts acetone were added while stirring, to 100 parts of a polyacetal obtained by polymerizing 98 parts trioxane and 2 parts ethylene oxide by the process described in Belgian Patent 610,391. The acetone was then removed in a nitrogen stream of 80° C., while stirring, and the product which had thus been freed from acetone was placed for 2 hours at 70° C. in a vacuum drier. To determine the resistance to aging of test pieces made of the stabilized copolymer, pressed plates 0.5 mm. thick were stored at 120° C. in a heating chamber and the time required for changing the plates to such an extent that they could no longer be bent without breaking was determined. To determine the thermostability, separate samples of the stabilized copolymer powder were kept at 230° C. under atmospheres of nitrogen and oxygen, respectively, and the loss in weight after 30 minutes was determined. The loss in weight in percent per minute is indicated in the table given hereinafter. The results obtained can be gathered from the table (1d). For comparison, the table also indicates the results obtained with the same copolymer containing no stabilizer (1a), or stabilized with a usual phenol (1b) or with a compound obtained by additive combination of acrylonitrile with the said phenol (1c).

EXAMPLE 2

100 parts of the copolymer used in Example 1 were mixed with 1 part 4 - methyl - 2,6 - di-(phenylethyl)-phenoxy-propionitrile+0.2 part dicyandiamide in 100 parts acetone and treated and tested in the manner described in Example 1. The results obtained are also indicated in the table.

EXAMPLE 3

100 parts of the copolymer used in Example 1 were mixed with 1 part 4-methyl-2,6-di-(phenylethyl)-phenoxy-propionitrile and 0.2 part dicyandiamide in 100 parts acetone and treated and tested in the manner described in Example 1. The test results obtained are indicated in the table.

EXAMPLE 4

100 parts of the copolymer used in Example 1 were mixed with 1 part 2 - tert.-butyl - 4 - isobornyl-phenoxy-propionitrile in 100 parts acetone and treated and tested as described in Example 1. The test results obtained are indicated in the table.

EXAMPLE 5

100 parts of the copolymer used in Example 1 were mixed with 1 part 2-tert.-butyl-4-methyl-phenoxy-propionitrile and 0.2 part dicyandiamide in 100 parts acetone and treated and tested as described in Example 1. The test results obtained are indicated in the table.

EXAMPLE 6

100 parts of the copolymer used in Example 1 were mixed with 1 part 2 - tert. - butyl - 4 - methyl-phenoxy-propionitrile and 0.2 part biguanide in 100 parts acetone and treated and tested as described in Example 1. The test results obtained are indicated in the table.

EXAMPLE 7

100 parts of the copolymer used in Example 1 were mixed with 1 part 3-methyl-6-tert.-butylphenoxy-propionitrile and 0.2 part dicyandiamide in 100 parts acetone and treated and tested as described in Example 1. The test results obtained are indicated in the table.

EXAMPLE 8

100 parts of the copolymer used in Example 1 were mixed with 1 part 2-isobornyl-4,6-dimethyl-phenoxy-propionitrile and 0.2 part dicyandiamide in 100 parts acetone and treated and tested as described in Example 1. The test results obtained are indicated in the table.

EXAMPLE 9

100 parts of the copolymer used in Example 1 were mixed with 1 part 3-methyl-6-tert.-butyl-2,4-di-isobornyl-phenoxypropionitrile and 0.2 part dicyandiamide in 100 parts acetone and treated and tested as described in Example 1. The test results obtained are indicated in the table.

Table

| Ex. No. | Stabilizer | Percent by weight | Loss in weight at 230° C. under N₂ in percent per minute | Loss in weight at 230° C. under O₂ in percent per minute | Embrittlement at 120° C. in heating chamber in days |
|---|---|---|---|---|---|
| (1) | (a) None | | 0.60 | 1.65 | 40 |
| | (b) Dihydroxy-2,2'-di-tert.-butyl-4,4'-di-methyl-6,6'-diphenylmethane. | 1 | 0.32 | 1.79 | 40 |
| | (c) 6,6'-bis-(2-tert.-butyl-4-methyl-phenoxy-propionitrile)-methane. | 1 | 0.34 | 0.80 | 50 |
| | (d) 6,6'-bis-(2-tert.-butyl-4-methyl-1-phenoxy-propionitrile)-methane. plus dicyandiamide | 1 0.2 | 0.032 | 0.17 | 90 |
| (2) | 4-methyl-2,6-di-(phenylethyl)-phenoxy-propionitrile | 1 | 0.053 | 0.26 | 80 |
| (3) | 4-methyl-2,6-di-(phenylethyl)-phenoxy-propionitrile plus dicyandiamide | 1 0.2 | 0.013 | 0.22 | 80 |
| (4) | 2-tert.-butyl-4-iso-bornyl-phenoxy-propionitrile | 1 | 0.021 | 0.20 | 85 |
| (5) | 2-tert.-butyl-4-methylphenoxy-propionitrile plus dicyandiamide | 1 0.2 | 0.02 | 0.15 | 80 |
| (6) | 2-tert.-butyl-4-methylphenoxy-propionitrile plus biguanide | 1 0.2 | 0.06 | 0.29 | 56 |
| (7) | 3-methyl-6-tert.-butylphenoxy-propionitrile plus dicyandiamide | 1 0.2 | 0.05 | 0.16 | 95 |
| (8) | 2-isobornyl-4,6-dimethyl-phenoxy-propionitrile plus dicyandiamide | 1 0.2 | 0.01 | 0.33 | 70 |
| (9) | 3-methyl-6-tert.-butyl-2,4-di-isobornylphenoxy-propionitrile plus dicyandiamide | 1 0.2 | 0.017 | 0.29 | 75 |

We claim:

1. A copolymeric polyacetal stabilized with at least one substituted phenoxypropionitrile selected from the group consisting of mono-phenoxypropionitriles and bis-phenoxypropionitrile alkanes having at least one aliphatic hydrocarbon radical having 1 to 7 carbon atoms, a phenylethyl radical, or an isobornyl radical as a substituent thereon, said copolymeric polyacetal having structural units consisting essentially of —O—CH₂— groups and

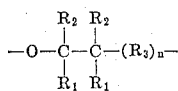

groups, wherein each $R_1$ and $R_2$ is hydrogen, lower alkyl, or halogen-substituted lower alkly, $R_3$ is methylene, oxymethylene, lower alkyl-substituted methylene, haloalkyl-substituted methylene, lower alkyl-substituted oxymethylene, or haloalkyl-substituted oxymethylene, and $n$ is an integer from zero to three.

2. A stabilized copolymeric polyacetal as in claim 1 wherein said substituted phenoxypropionitrile is a substituted mono-phenoxypropionitrile.

3. A stabilized copolymeric polyacetal as in claim 1 wherein said substituted phenoxypropionitrile is a substituted bis-phenoxypropionitrile alkane.

4. A stabilized copolymeric polyacetal as in claim 1 wherein said substituted phenoxypropionitrile is an ortho-substituted phenoxypropionitrile.

5. A stabilized copolymeric polyacetal as in claim 1 wherein said substituted phenoxypropionitrile is a para-substituted phenoxypropionitrile.

6. A stabilized copolymeric polyacetal as in claim 1 wherein said substituted phenoxypropionitrile is an ortho- and para-substituted phenoxypropionitrile.

7. A stabilized copolymeric polyacetal as in claim 1 which additionally contains a costabilizer selected from the group consisting of dicyandiamide, biguanide, formamide, and melamine.

8. A stabilized copolymeric polyacetal as in claim 1 wherein said substituted phenoxypropionitrile is 6,6'-bis-(2-t-butyl-4-methyl-phenoxypropionitrile)-methane.

9. A stabilized copolymeric polyacetal as in claim 1 wherein said substituted phenoxypropionitrile is 4-methyl-2,6-di(phenylethyl)-phenoxypropionitrile.

10. A stabilized copolymeric polyacetal as in claim 1 wherein said substituted phenoxypropionitrile is 3-methyl-6-t-butyl-2,4-diisobornyl-phenoxypropionitrile.

11. A stabilized copolymeric polyacetal as in claim 1 wherein said substituted phenoxypropionitrile is 2-isobornyl-4,6-dimethyl-phenoxypropionitrile.

12. A stabilized copolymeric polyacetal as in claim 1 wherein said substituted phenoxypropionitrile is 2-t-butyl-4,6-diisobornyl-phenoxypropionitrile.

13. A stabilized copolymeric polyacetal as in claim 1 wherein said substituted phenoxypropionitrile is 2-t-butyl-4-isobornyl-phenoxypropionitrile.

14. A stabilized copolymeric polyacetal as in claim 1 wherein said substituted phenoxypropionitrile is 2-t-butyl-4-methyl-phenoxypropionitrile.

15. A stabilized copolymeric polyacetal as in claim 1 wherein said substituted phenoxypropionitrile is 3-methyl-6-t-butyl-phenoxypropionitrile.

16. A stabilized copolymeric polyacetal as in claim 1 wherein said copolymeric polyacetal consists of 90 to 99 percent, by weight of the copolymer, of polymerized trioxane, and 10 to 1 percent of a polymerized cyclic formal or a polymerized cyclic ether.

17. A stabilized copolymeric polyacetal as in claim 1 wherein said copolymeric polyacetal consists of 95 to 99 percent, by weight of said copolymer, of polymerized trioxane and 5 to 1 percent of polymerized ethylene oxide.

18. A stabilized copolymeric polyacetal as in claim 1 wherein said substituted phenoxypropionitrile is present in an amount from 0.1 to 10 percent by weight of said copolymer.

References Cited by the Examiner

FOREIGN PATENTS 885,113   11/1961   Great Britain.

OTHER REFERENCES

The Chemistry of Acrylonitrile, American Cyanamid Co., N.Y., 1959, p. 17. (Copy available in Group 140.)

Olah: Friedel-Crafts & Related Reactions, vol. II, Part I, Interscience, 1964, p. 344. (Copy available in Group 120.)

LEON J. BERCOVITZ, *Primary Examiner.*

M. J. WELSH, *Assistant Examiner.*